US005372345A

United States Patent [19]
Schmidt

[11] Patent Number: 5,372,345
[45] Date of Patent: Dec. 13, 1994

[54] EYEGLASS HOLDER

[76] Inventor: Ray T. Schmidt, 12008 S. Burgess Ave., Whittier, Calif. 90604

[21] Appl. No.: 78,610

[22] Filed: Jun. 16, 1993

[51] Int. Cl.$^5$ .............................................. B60R 7/00
[52] U.S. Cl. ................................ 248/231.8; 248/902; 224/312
[58] Field of Search ............... 211/13; 248/902, 231.8; 224/312, 42.45 R

[56] References Cited

U.S. PATENT DOCUMENTS

| | | |
|---|---|---|
| 2,468,437 | 4/1949 | Foley . |
| 2,826,387 | 3/1958 | Rutten . |
| 2,884,220 | 4/1959 | Manley . |
| 3,195,731 | 7/1965 | Bomar, Jr. . |
| 3,552,701 | 1/1971 | Montagano ................... 211/13 X |
| 3,817,392 | 6/1974 | Bloch . |
| 4,695,026 | 9/1987 | Medley, Jr. . |
| 4,715,575 | 12/1987 | Kamerer . |
| 4,867,402 | 9/1989 | Benson et al. ................ 248/902 X |
| 4,946,125 | 8/1990 | McCarty . |
| 5,016,759 | 5/1991 | Spamer ............................. 211/13 |
| 5,046,696 | 10/1991 | Lee . |
| 5,056,668 | 10/1991 | Berger ............................. 211/13 |
| 5,082,225 | 1/1992 | Nespoli ....................... 248/902 X |
| 5,096,102 | 3/1992 | Tolson ...................... 224/42.45 R |
| 5,100,006 | 3/1992 | Forrester ........................ 211/13 |
| 5,137,242 | 8/1992 | Reath . |

Primary Examiner—Blair M. Johnson
Attorney, Agent, or Firm—Boniard I. Brown

[57] ABSTRACT

An adjustable eyeglass holder to be mounted in an automotive vehicle, boat, airplane, office, room, or other location for holding conventional prescription eyeglasses and sun glasses, as well as clip-on eyeglasses attachable to conventional eyeglasses, and having a range of sizes and nose bridge configurations.

12 Claims, 2 Drawing Sheets

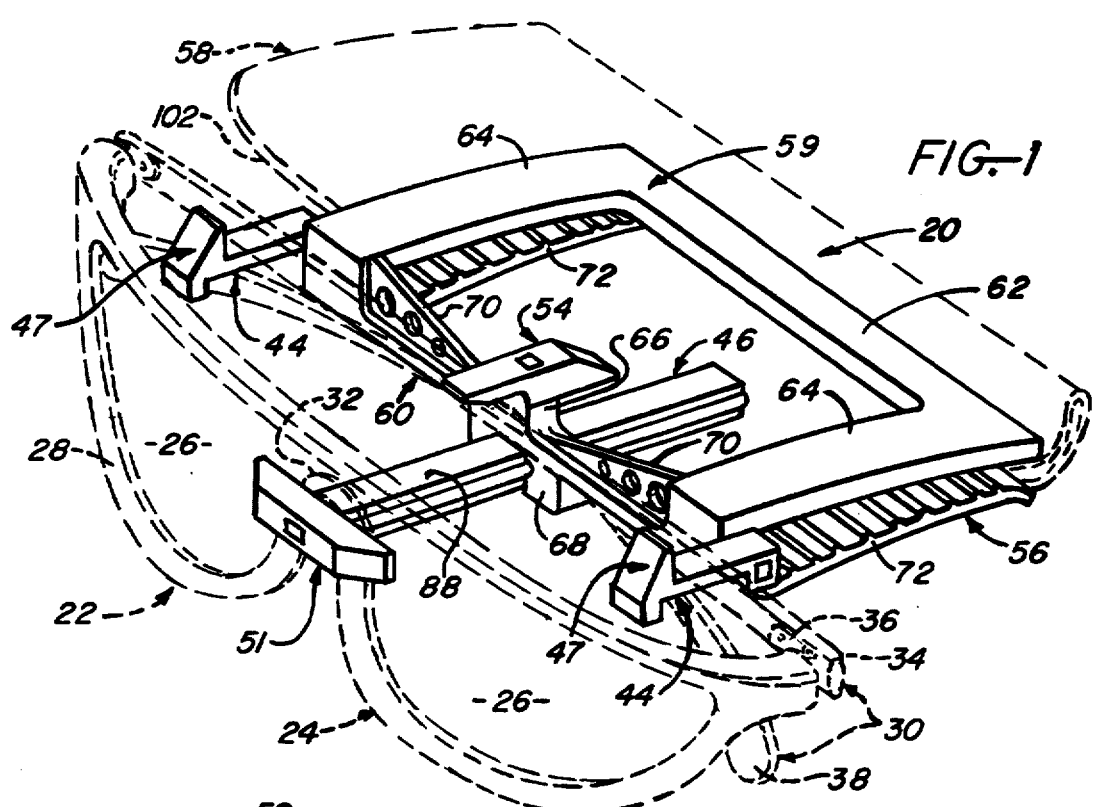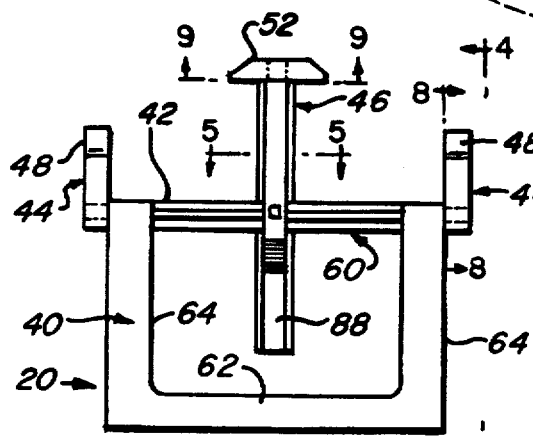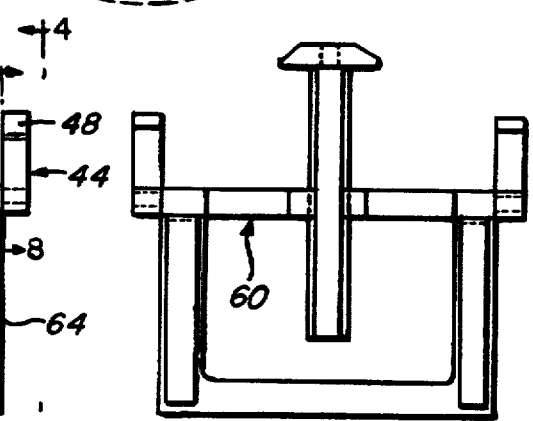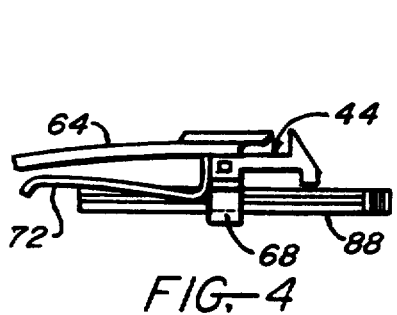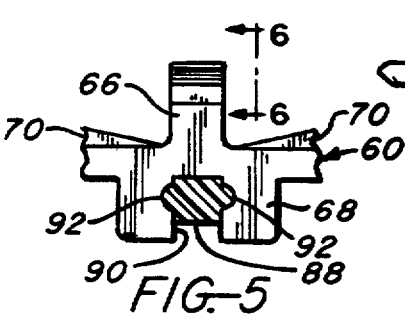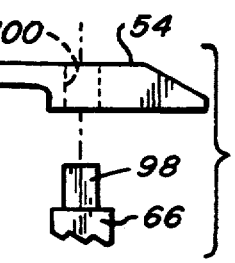

EYEGLASS HOLDER

BACKGROUND OF THE INVENTION

1. Field of the Invention

This invention relates generally to eyeglass accessories and more particularly to a novel eyeglass holder to be mounted in an automotive vehicle, boat, airplane, office, room, or other location for holding eyeglasses when not in use, and in such a way that glasses may be conveniently placed in and removed from the holder.

2. Prior Art

Eyeglasses are made in two basic types, referred to herein as conventional glasses and clip-on glasses. Conventional glasses may be normal prescription glasses, sun glasses, or prescription sunglasses and have a nose bridge and hinged temples which are foldable into crossing or endwise overlapping relation behind the nose bridge to place the glasses in a compact folded configuration in which the glasses may be placed in a pocket or other receptacle. Clip-on glasses are usually sunglasses and have clips rather than temples for releasable attachment to conventional glasses.

Eyeglass holders are useful in those situations in which eyeglasses are worn intermittently in one particular location and/or are always left at that location when the wearer leaves the location. In these situations, it is convenient to have an eyeglass holder available into which the eyeglasses may be easily placed when not in use and from which the glasses may be easily removed when needed. This eliminates the neccessity of looking for the glasses when needed and avoids damage to the glasses when not in use.

Some of the places where the above situation arises are automotive vehicles, boats, airplanes, offices, rooms, and the like. Thus, persons operating vehicles, such as automotive vehicles, airplanes, and boats, generally wear sun glasses in bright daylight or sunlight and remove the sunglasses when the light dims. Some vehicle operators wear prescription glasses when operating a vehicle. In each case, the glasses are often left in the vehicle at all times. Unless the glasses are placed in a holder when not in use, they are easily misplaced, lost, or damaged, and are especially difficult for the operator to locate when driving. Searching for glasses when driving also creates an additional driving risk. Other places where this situation arises is in an office or in a room of a home in which glasses are worn intermittently and/or left when the wearer leaves.

One common type of existing eyeglass holder is a pouch or hinged-cover holder of the kind which are often provided with eyeglasses when purchased. These holders may be placed in the pocket or on a support. While satisfactory for some purposes, these holders are undesirable or unsuitable for use in the situations mentioned above. In the first place, these holders are just as prone to being misplaced or lost as eyeglasses themselves. Further, two hands are required to place glasses in and remove glasses from such holders. Accordingly, these holders are not suitable for use by operators of moving vehicles.

The best eyeglass holder for the situations mentioned above is one which is fixed to a relatively stationary support of some kind, such as a sun visor, rear view mirror, or dash of a vehicle, an office or room wall, a desk, shelve, or the like. The prior art is replete with a number of patents disclosing eyeglass holders of this kind. Among these patents are the following: U.S. Pat. Nos. 2,468,437, 2,826,387, 2,884,220, 3,195,731, 3,817,392, 4,695,026, 4,715,575, 4,946,125, 5,046,696, 5,137,242.

SUMMARY OF THE INVENTION

The eyeglass holder of this invention is designed to receive, in one embodiment, conventional eyeglasses having certain types of nose bridges and temples which are folded inwardly to place the eyeglasses in the folded configuration mentioned above and, in other embodiments, both the above conventional glasses and clip-on glasses or, alternatively, conventional glasses having certain other, relatively high nose bridges. The eyeglasses may be either sun glasses or normal prescription glasses. The eyeglass holder includes a mounting base, a pair of outer eyeglass supports extending beyond the base, and a center eyeglass support extending beyond the base between the two outer supports. The three supports have normally upper and lower sides, inner ends secured to the base, and opposite outer ends. At the inner ends of the arms is an inner, outwardly facing support surface. The center support has an eyeglass nose bridge engaging means at its outer end. The two outer supports have inwardly facing shoulders adjacent their outer ends located between the center support bridge engaging means and the inner support surface. In the disclosed holder embodiments, this inner support surface is the front side of the base.

The eyeglass holder receives folded eyeglasses in a normal position wherein (a) the eyeglass nose bridge engages the nose bridge engaging means on the center support, (b) the folded eyeglass temples extend across the upper side of the center support adjacent the inner support surface, and (c) the hinged ends and tips of the temples extend across the upper and lower sides, respectively, of the outer eyeglass supports between the outer support shoulders and the inner support surface. A hold-down member projects outwardly beyond the inner support surface for holding the folded temples against the eyeglass supports. The preferred eyeglass holder has means for adjusting the center support nose bridge engaging means toward and away from the inner support surface to accomodate a range of eyeglass sizes.

As will appear from the later description, an eyeglass holder according to the invention may be fabricated in various ways. The preferred holder described herein has several molded parts joined by pin and socket connections. The center eyeglass support is a relatively long arm which slides endwise in a guideway in the base to adjust the spacing between the center support nose bridge engaging means and the inner support surface. The two outer supports are relatively short arms which parallel the center support arm.

In one described eyeglass holder, the bridge engaging means on the center support is an inwardly facing shoulder provided by a cross member at the outer end of the center support arm. This cross member extends beyond opposite lateral sides of the center arm for engaging the front side of the nose bridge of the eyeglasses positioned on the holder. In other described holders, the nose bridge engaging means are upstanding nose bridge supports for supporting clip-on eyeglasses and the elevated nose bridge of certain styles of eyeglasses. Each outer support arm has a shoulder on its upper side for engaging the hinged end of one eyeglass temple and a shoulder on its lower side for engaging the tip of the other eyeglass temple. The center support nose bridge engaging means is attached to the center support arm, and the outer support arms and temple hold-down member are attached to the holder base, by pin and socket connections. This holder construction permits molding of the holder in several easily assembled parts, renders the outer support arms interchangeable, and permits any one of the different nose bridge engaging means to be mounted on the holder.

The eyeglass holder may be used in a vehicle including an automotive vehicle, boat, or airplane, as well as in an office, a home or any other location and may be mounted on any appropriate support by securing the holder mounting base to the support. In the case of an office or a room, the fixed support may be a wall, desk, shelf, cabinet, or other article. The described embodiments of the invention are particularly adapted for use in a vehicle and have means for securing the holder base to a sun visor, rear view mirror, or dash of the vehicle.

BRIEF DESCRIPTION OF THE DRAWINGS

FIG. 1 is a perspective view of a presently preferred eyeglass holder according to the invention and showing in broken lines an automobile sun visor mounting the holder and eyeglasses positioned in the holder;

FIG. 2 is a top view of the eyeglass holder on reduced scale;

FIG. 3 is a bottom view the eyeglass holder on reduced scale;

FIG. 4 is a side view of the holder looking in the direction of the arrows on line 4—4 in FIG. 2;

FIG. 5 is an enlarged section taken on line 5—5 in FIG. 2;

FIG. 6 is an exploded view looking in the direction of the arrows on line 6—6 in FIG. 5;

DESCRIPTION OF THE PREFERRED EMBODIMENT

Figure 7:
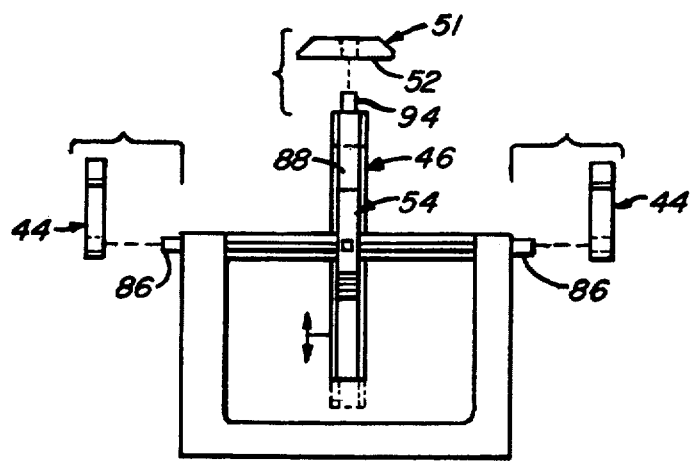
FIG. 7 is an exploded top view of the eyeglass holder.

Referring now to these drawings and first to FIGS. 1-10 thereof, there is illustrated an holder 20 according to this invention for a pair of eyeglasses 22. The illustrated glasses are sun glasses, but the holder can hold regular prescription glasses as well. The eyeglasses include a frame 24 and lenses 26 mounted in the frame. The frame has a front part 28 mounting the lenses 26, and hinged temples 30. The front frame part 28 includes a nose bridge 32 between the lenses 26. While the illustrated bridge 32 is a generally saddle-shaped portion of the front frame part, it will become evident as the description proceeds that the eyeglass holder of the invention can hold eyeglasses having any type of nose bridge. The temples 30 are essentially mirror images of one another and have hinged ends 34 attached by hinges 36 to opposite ends of the front frame part 28 and opposite outer free ends terminating in tips 38.

When the eyeglasses 22 are worn, the nose bridge 32 engages over the wearer's nose. The temples 30 extend rearwardly along the sides of the wearer's head and over the wearer's ears. When not in use, the temples 30 may be folded inwardly toward one another about their hinges 36 to place the eyeglasses in the compact folded configuration shown in broken lines in FIG. 1. In this folded configuration, the temples 30 are disposed side by side in endwise overlapping relation behind the nose bridge 32, as illustrated in the drawings. The tip 38 of each temple is then located generally below the hinged inner end 34 of the other temple.

The eyeglass holder 20 of this invention is designed to receive eyeglasses in this folded configuration. The holder includes a base 40, a surface 42, a pair of outer eyeglass supports 44 extending beyond the surface 42, and a center eyeglass support 46 extending beyond the surface 42 between the two outer supports. The three eyeglass supports 44, 46 have normally upper and lower sides, inner ends secured to the base, and opposite outer ends. The surface 42 is at the inner ends of and disposed in a plane transverse to the supports. In the illustrated holder, this surface is the front side of the base 40.

The two outer supports 44 include eyeglass temple engaging means 47 at the outer ends of the supports in the form of inwardly facing upper and lower shoulders 48, 50. These shoulders face inwardly toward the front base side 42. At the outer end of the center support 46 is an eyeglass nose bridge engaging means 51 in the form of an inwardly facing shoulder 52 which also faces inwardly toward the front base side. The lower outer support shoulders 50 are spaced from the front base side 42 a slightly greater distance than the upper outer support shoulders 48. All of the outer support shoulders are spaced from the front base side a distance less than the spacing between the front base side and the center support shoulder 52.

Mounted on the base 40 and extending outwardly beyond the front base side 42 over the center support 46 is a temple hold-down member 54. The base includes attachment means 56 for attaching the base to a suitable support.

Referring now in more detail to the drawings, the eyeglass holder 20 illustrated in FIGS. 1-10 is intended for use in a vehicle having a sun visor 58. The holder base 40 has an upper, generally open rectangular part 59 including front and rear base portions 60, 62 integrally and rigidly joined at their ends by side base portions 64. The rear and side base portions 62, 64 have a relatively uniform width and thickness. The front base portion 60 extends between and depends flange-like below the front ends of the side base portions 64.

The front base portion 60 includes an upper, upstanding boss 66 and a lower depending lug 68 opposite the boss. The boss 66 and lug 68 are located midway between the base side portions 64. Within the regions between the base side portions 64 and the boss 66, the upper side of the front base portion 60 is recessed and shaped to form relatively thin and longitudinally tapered rib-like sections 70 containing longitudinally spaced holes. The front side of the front base portion 60 is the front side 42 of the base.

The upper rectangular base part 59 is shaped, in this case is slightly curved in its fore and aft direction, to seat on the visor 58. The illustrated attachment means 56 of the holder comprise a pair of spring clips 72 which form part of the holder base 40 and are located at the underside of the base part 59 below the two base side portions 64, respectively. These spring clips extend lengthwise of the base side portions 64 and are rigidly secured at their front ends to the rear side of the depending flange-like front base portion 60. The spring clips are resiliently biassed against the base side portions 64 so as to form with these base side portions spring clamps for resiliently gripping the visor 58, as explained later. The surfaces of the spring clips 72 facing the side base portions 64 are ribbed, as shown, to enable the clips to firmly grip the visor.

Figure 8:
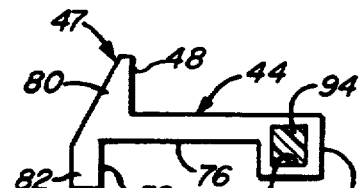
FIG. 8 is an enlarged section taken on line 8—8 in FIG. 2 illustrating an outer eyeglass support of the holder.
Figure 9:
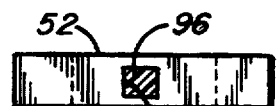
FIG. 9 is an enlarged section taken on line 9—9 in FIG. 2 illustrating an eyeglass nose bridge engaging shoulder of the holder.

The illustrated mounting base part 59, spring clips 72, eyeglass supports 44, 46, center support nose bridge engaging means 51, and temple hold-down member 54 are separately formed parts which are preferably fabricated by a molding or other shaping process. The two outer eyeglass supports 44 are identical. As shown best in FIG. 8, each outer support includes an arm 76 having an integral rectangular enlargement 78 at one end (its inner end) and integral upstanding and depending shoulder formations 80, 82 at its other (outer) end. Extending through the enlargement 78 is a rectangular hole or socket 84. The upper shoulder formation 80 is tapered and has an inner face which forms the upper support shoulder 48. The lower shoulder formation 82 has a rectangular shape and an inner face which forms the lower support shoulder 50. As shown in FIG. 8, the lower shoulder 50 is located a small distance beyond the upper shoulder 48.

At the ends of the front base portion 60 are pegs or pins 86 (FIG. 7) which are sized and shaped to fit snugly within the sockets 84 in the outer eyeglass supports 44. These outer supports are assembled on the base by pressing the supports over the pins 86 and against the ends of the front base portion 60. The outer supports may have a sufficiently snug fit on the pins to retain the supports on the pins, or the supports may be bonded or otherwise secured to the pins. In either event, the pins 86 and sockets 84 form pin and socket connections between the outer eyeglass supports 44 and the mounting base 40.

The center eyeglass support 46 comprises an elongate arm 88 which is slidably adjustable endwise within a guideway 90 (FIG. 5) extending through the lower depending lug 68 on the front base portion 60. The center support arm and guideway are sized so that the support arm is longitudinally adjustable in the guideway relative to the base 40 and is frictionally retained in longitudinally adjusted position. Along opposite lateral sides of the center support arm 88 are rounded longitudinal ribs 92 which engage within grooves in the side walls of the guideway 90 to retain the support arm laterally in the guideway.

The eyeglass nose bridge engaging means 51 on the center support arm 88 comprises a cross member having an inner face which forms the center support shoulder 52. The support arm 88 has lateral sides between its upper and lower sides, and the cross member 51 projects beyond these lateral sides. Extending endwise from the outer end of the support arm 88 is a pin 94 of rectangular cross-section which fits snugly within a rectangular socket 96 (FIG. 9) in the center of the cross member 51 to form a pin and socket connection between the support arm and cross member.

The hold-down member 54 sits on the upper end of the upstanding boss 66 on the front base portion 60. This hold-down member is secured to the boss by a pin and socket connection including an integral upstanding pin 98 (FIG. 6) on the boss engaging snugly within a rectangular socket 100 in the hold-down member.

Figure 10:
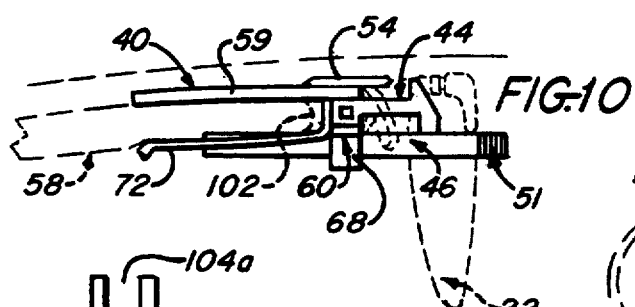
FIG. 10 is a side view of the eyeglass holder showing in broken lines an automobile sun visor mounting the holder and eyeglasses positioned in the holder.
Figure 12:
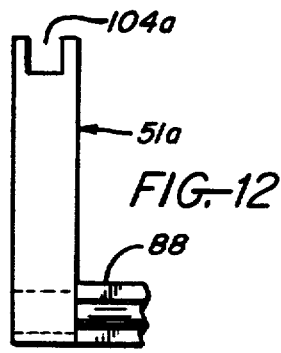
FIG. 12 is a view taken on line 12—12 in FIG. 11.
Figure 11:
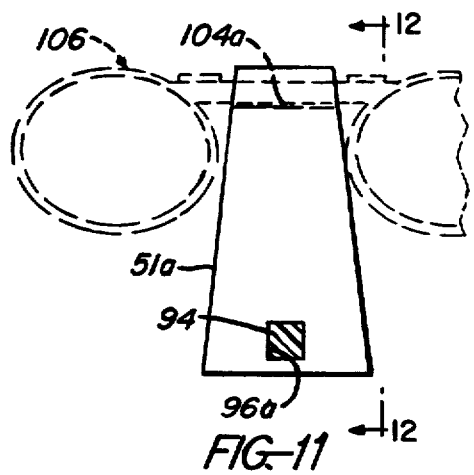
FIG. 11 is a section similar to FIG. 9 through a modified eyeglass holder illustrating an eyeglass nose bridge support of the holder.

The eyeglass holder 20 is placed on the visor 58 by engaging the free edge 102 of the visor between the holder base part 59 and spring clips 72 and then pushing the holder base 40 rearwardly across the visor to a position wherein the visor edge is close to or abuts the rear side of the depending front base portion 60, as shown best in FIG. 10. The visor is then firmly gripped between the base part 59 and the spring clips 72.

The holder 20 receives folded eyeglasses 22 in a normal position (FIG. 1) wherein (a) the glasses are situated between the front side 42 of the mounting base 40 and the eyeglass support shoulders 46, 48, 52, (b) the eyeglass nose bridge 32 extends across and rests on the upper side of the center support arm 88 closely adjacent the center support shoulder 52, (c) the crossed eyeglass temples 30 extend across the upper side of the center support arm 88 closely adjacent the front base side 42, (d) the hinged ends 34 of the temples extend over and rest on the upper sides of the outer eyeglass support arms 76 between the upper shoulders 48 and the front base side 42, and (d) the tips 38 of the eyeglass temples extend below the outer support arms 76 between the lower support shoulders 50 and the front base side 42. The hold-down member 54 projects over the crossed eyeglass temples 30 to hold them down against the eyeglass support arms. The eyeglasses are thereby confined between the support shoulders and the front base side and firmly retained in position on the eyeglass supports by the hold-down member. As shown in FIG. 10, the visor 58 may be rotated upwardly to its retracted position when mounting the eyeglass holder.

It is evident at this point that the illustrated eyeglass holder 20 may be mounted on a support other than an automobile visor. Thus the holder base 40 could be clipped to a wall shelf, desk, or other convenient support. Alternatively, the upper base part 59 could be eliminated, and the holder clips 72 used as a mounting base to be secured to the dash of a vehicle or other mounting surface. Two-sided pressure sensitive tape applied to the undersides of the spring clips could be used to secure the clips to the mounting surface.

FIGS. 11-14 illustrate, in fragmentary fashion, modified eyeglass holders 20a and 20b according to the invention having modified nose bridge engaging members 51a, 51b, respectively, on the center support arm 88 in place of the cross member 51 in FIGS. 1-10. Except for these modified bridge engaging means, the holders of FIGS. 11-14 are identical to that of FIGS. 1-10 and hence only the outer end of center eyeglass support arm 88 is shown. The modified nose bridge engaging members 51a, 51b are flat nose bridge supports which project edgewise beyond opposite lateral sides of the center support arm 88 and upwardly from the arm. Nose bridge supports 51a, 51b are convergently tapered edgewise toward their upper ends and have normally lower sockets 96a, 96b receiving the pin 94 on the center eyeglass support arm 88. Entering the normally upper edges of the bridge supports 51a, 51b in planes transverse to the center support arm are grooves 104a, 104b, respectively. The groove 104b in the bridge support 51b extends downward part way along the tapered edges of the support. The rear wall of this latter groove is cut away along a portion of each tapered side of the bridge support.

The modified eyeglass holders 20a, 20b are adapted to receive conventional eyeglasses, such as those illustrated in FIG. 1, in the same way as described above in connection with the eyeglass holder 20. Thus, conventional eyeglasses like those illustrated in FIG. 1 may be placed in the modified holders with the eyeglass nose bridge resting on the center support arm 88 immediately inwardly of the bridge supports 51a, 51b which, in this case, provide inwardly facing shoulders for engaging the front side of the eyeglass nose bridge. Clip-on eye glasses 106 may also be placed on the bridge supports within their grooves 104a, 104b, as illustrated, so that the holder can hold both conventional and clip-on glasses simultaneously. Alternatively, the modified eyeglass holders 20a, 20b can be used to hold conventional eyeglasses having relatively high nose bridges by placing the glasses on the holders with eyeglass nose bridges seating in the upper grooves 104a, 104b of the bridge supports 51a, 51b.

Figure 15:
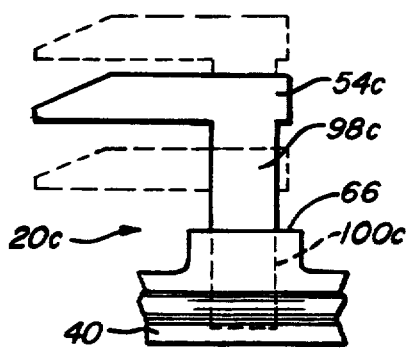
FIG. 15 is a view similar to FIG. 6, illustrating a modified temple hold-down member.
Figure 13:
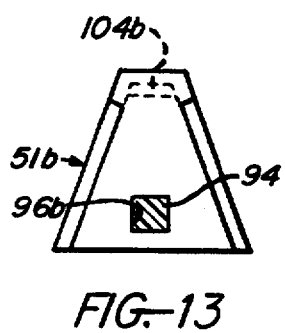
FIG. 13 is a section taken on line 13—13 in FIG. 14 and through a further modified eyeglass holder illustrating an eyeglass nose bridge support of the holder.
Figure 14:
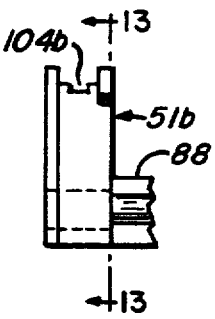
FIG. 14 is a side elevational view of the eyeglass holder of FIG. 13.

FIG. 15 illustrates a modified holder 20c identical to the holder 20, except that the temple-hold down member 54 of holder 20 is replaced by a hold-down member 54c. Hold down member 54c has a post 98c which fits snugly but removably in a socket 100c in the upper boss 66 on the base 40. The hold-down member projects beyond the front side of the base to hold the folded eyeglass temples against the support arms. The hold-down member 54c is removable for replacement by one having a post 98c of different length to accommodate eyeglass temples of different widths. Several hold-down members of different post length may be provided with the holder.

I claim:

1. An eyeglass holder for eyeglasses having a bridge portion and a pair of temples having hinged ends and which are rotatable about said hinged ends to place the eyeglasses in a folded configuration wherein the temples are disposed in longitudinally overlapping relation behind said bridge portion, said holder comprising:

a base having a normally front side, a pair of outer elongate generally coplanar eyeglass support arms transverse to and extending beyond said front side of said base and having inner ends mounted on said base, outer free ends beyond said front base side, exposed normally upper and lower longitudinal sides between said ends, and shoulders at said outer free ends of the arms projecting above said upper arm sides, a center elongate eyeglass support arm between said outer support arms and having an inner end mounted on said base, an outer free end beyond the outer support arm shoulders, exposed normally upper and laterally facing longitudinal sides between said ends of the center support arm, and a shoulder at said outer end of the center arm projecting beyond at least one of said center support arm sides and facing said front base side, means for adjusting the spacing between said center support arm shoulder and said front base side generally endwise of and parallel to the common plane of said support arms, and wherein said holder is adapted to support said eyeglasses in said folded configuration and in a position wherein said eyeglass bridge portion rests on the upper longitudinal side of said center support arm adjacent said center support arm shoulder, and the hinged ends of said eyeglass temples rest on the upper longitudinal sides of said outer support arms adjacent said outer support arm shoulders.

2. An eyeglass holder according to claim 1 wherein: said means for adjusting the spacing between said center support arm shoulder and said front base side comprises means on said base supporting said center support arm for longitudinal adjustment relative to said base.

3. An eyeglass holder according to claim 1 including: a temple hold down member on said base projecting beyond said front base side over said upper longitudinal side of said center support arm.

4. An eyeglass holder according to claim 1 wherein: said base comprises a clamp for securing said holder to a support.

5. An eyeglass holder according to claim 1 wherein: said outer support arm shoulders include normally upper shoulders which project above said upper longitudinal sides of the outer support arms for engaging the hinged ends of the eyeglass temples and normally lower shoulders which depend below the normally lower sides of the outer support arms.

6. An eyeglass holder according to claim 1 wherein: said center support arm shoulder comprises a plate transverse to and projecting edgewise above the upper longitudinal side of the center support arm and having a normally upwardly opening edge groove, and said center support arm shoulder is adapted to support other eyeglasses having a bridge portion with the latter bridge portion resting in said groove.

7. An eyeglass holder according to claim 1 wherein: said base and said outer support arms have engaging pin and socket means securing said outer support arms to said base, and said center support arm and said center support arm shoulder have engaging pin and socket means securing said center support arm shoulder to said center support arm.

8. An eyeglass holder according to claim 1 wherein: said base and temple hold down member include engaging pin and socket means removably mounting said hold down on said base to permit replacement of the hold down by another hold down member of different size.

9. An eyeglass holder for eyeglasses having a bridge portion and a pair of temples having hinged ends and opposite free ends and which are rotatable about said hinged ends to place the eyeglasses in a folded configuration wherein the temples are disposed in longitudinally overlapping relation behind said bridge portion, said holder comprising:

a base comprising a clamp for securing the base to a support and having a normally front side, a pair of outer elongate generally parallel eyeglass support arms transverse to and extending beyond said front side of said base and having inner ends mounted on said base, outer free ends beyond said front base side, exposed normally upper and lower longitudinal sides between said ends, and upper and lower shoulders at said outer free ends of said arms projecting above the upper sides and depending below the lower sides, respectively, of the arms and facing said front base side, a center elongate eyeglass support arm between and generally parallel to said outer support arms and having an inner end slidably supported on said base for endwise adjustment of the center support arm relative to the base, an outer free end beyond the outer ends of said outer support arms, exposed normally upper and laterally facing longitudinal sides between said center support arm ends, a shoulder at said outer end of the center arm projecting beyond at least one of said center support arm sides and facing said front base side, and wherein said center support arm is longitudinally adjustable relative to said base to adjust the spacing between said center support arm shoulder and said front base side, a temple hold down member on said base projecting beyond said front base side over said upper longitudinal side of said center support arm, and said holder is adapted to support said eyeglasses in said folded configuration and in a position wherein said eyeglasses bridge portion rests on the upper longitudinal side of said center support arm adjacent said center support arm shoulder, the hinged ends of the eyeglass temple rest on said upper longitudinal sides of said outer support arms adjacent said outer support arm shoulders, and the free ends of the eyeglass temples are disposed below said outer arms and adjacent said lower outer support arm shoulders.

10. An eyeglass holder according to claim 9 wherein:

said center support arm shoulder comprises a plate transverse to and projecting edgewise above the upper longitudinal side of the center support arm and having a normally upwardly opening edge groove, and said plate is adapted to support other eyeglasses having a bridge portion with the latter bridge portion resting in said groove.

11. An eyeglass holder according to claim 9 wherein:

said base and said outer support arms have engaging pin and socket means securing said outer support arms to said base, and said center support arm and said center support arm shoulder have engaging pin and socket means securing said center support arm shoulder to said center support arm.

12. An eyeglass holder according to claim 9 wherein:

said base and temple hold down member include engaging pin and socket means removably mounting said hold down on said base to permit replacement of the hold down by another hold down member of different size.

* * * * *